(12) United States Patent
Jolley

(10) Patent No.: US 12,463,487 B2
(45) Date of Patent: Nov. 4, 2025

(54) MAGNET WIRE WITH A SEMI-CONDUCTIVE INSULATION LAYER

(71) Applicant: Essex Furukawa Magnet Wire USA LLC, Atlanta, GA (US)

(72) Inventor: Scott Ted Jolley, Davenport, FL (US)

(73) Assignee: Essex Solutions USA LLC, Atlanta, GA (US)

( * ) Notice: Subject to any disclaimer, the term of this patent is extended or adjusted under 35 U.S.C. 154(b) by 0 days.

(21) Appl. No.: 18/443,234

(22) Filed: Feb. 15, 2024

(65) Prior Publication Data

US 2024/0235310 A1 Jul. 11, 2024

Related U.S. Application Data

(63) Continuation of application No. 17/395,136, filed on Aug. 5, 2021, now abandoned.

(51) Int. Cl.
| | |
|---|---|
| *H02K 3/30* | (2006.01) |
| *C08K 3/16* | (2006.01) |
| *C08K 3/22* | (2006.01) |
| *H01B 3/00* | (2006.01) |
| *H01B 7/02* | (2006.01) |

(Continued)

(52) U.S. Cl.
CPC ............... *H02K 3/40* (2013.01); *C08K 3/16* (2013.01); *C08K 3/22* (2013.01); *H01B 3/004* (2013.01); *H01B 7/0208* (2013.01); *H01B 13/0026* (2013.01); *H01B 13/0036* (2013.01); *H01B 13/016* (2013.01); *H01B 13/067* (2013.01); *H02K 3/30* (2013.01); *C08K 2003/2231* (2013.01); *C08K 2201/001* (2013.01)

(58) Field of Classification Search
CPC .... H01B 3/004; H02K 3/30; C08K 2201/001; C08K 5/0091; C08K 3/22; C08K 3/08; C08L 79/08
See application file for complete search history.

(56) References Cited

U.S. PATENT DOCUMENTS

| | | |
|---|---|---|
| 3,577,346 A | 5/1971 | McKeown |
| 5,502,156 A | 3/1996 | St. Clair et al. |

(Continued)

FOREIGN PATENT DOCUMENTS

| | | |
|---|---|---|
| GB | 2331872 | 6/1999 |

OTHER PUBLICATIONS

IST Technical Bulletin #ML-1-95, upload date Jan. 2019.*

(Continued)

*Primary Examiner* — Alex A Rolland
(74) *Attorney, Agent, or Firm* — Rhett White

(57) ABSTRACT

A method for forming magnet wire with improved partial discharge performance may include providing a conductor, forming a first layer of polymeric enamel insulation formed around the conductor, and forming a second semi-conductive layer around the first layer. Forming the second layer may include providing a base polyamic acid and complexing filler particles with the base polyamic acid. The polyamic acid may be applied around the first layer, and the filler particles may migrate towards an outer surface of the second layer. The polyamic acid may be cured to form a semi-conductive enamel layer, and at least sixty percent by weight of the filler particles may be positioned within an outer half of the second layer following the migration.

21 Claims, 5 Drawing Sheets

(51) Int. Cl.
*H01B 13/00* (2006.01)
*H01B 13/016* (2006.01)
*H01B 13/06* (2006.01)
*H02K 3/40* (2006.01)

(56) References Cited

U.S. PATENT DOCUMENTS

| | | | |
|---|---|---|---|
| 2005/0118422 A1* | 6/2005 | Cipelli | H01B 3/306 |
| | | | 428/375 |
| 2010/0108356 A1 | 5/2010 | Abe et al. | |
| 2013/0240241 A1 | 9/2013 | Dubrow et al. | |
| 2015/0004325 A1* | 1/2015 | Walker | B05D 1/04 |
| | | | 252/514 |
| 2015/0243409 A1* | 8/2015 | Gronowski | H01F 27/288 |
| | | | 427/118 |
| 2015/0243410 A1 | 8/2015 | Knerr et al. | |
| 2019/0068020 A1 | 2/2019 | Knerr et al. | |
| 2019/0279784 A1 | 9/2019 | Knerr et al. | |
| 2020/0251243 A1 | 8/2020 | Knerr | |
| 2020/0312535 A1 | 10/2020 | Said et al. | |

OTHER PUBLICATIONS

Written Opinion mailed Dec. 28, 2022 for Application No. PCT/US22/39583.
Extended European Search Report for PCT/US2022039583, mailed Aug. 19, 2025, 10 pages.

* cited by examiner

MAGNET WIRE WITH A SEMI-CONDUCTIVE INSULATION LAYER

CROSS-REFERENCE TO RELATED APPLICATION

This application is a continuation of U.S. Pat. No. 17,395,136, filed Aug. 5, 2021 and entitled "Magnet Wire with Semi-conductive Insulation Layer", which is incorporated by reference herein in its entirety.

TECHNICAL FIELD

Embodiments of the disclosure relate generally to magnet wire and, more particularly, to magnet wire that includes a semi-conductive layer that assists in dissipating energy associated with partial discharge.

BACKGROUND

Magnet wire, also referred to as winding wire or magnetic winding wire, is utilized in a wide variety of electric machines and devices, such as inverter drive motors, motor starter generators, transformers, etc. Magnet wire typically includes polymeric enamel insulation formed around a central conductor. The enamel insulation is formed by applying a varnish onto the magnet wire and curing the varnish in an oven to remove solvents, thereby forming a thin enamel layer. This process is repeated until a desired enamel build or thickness has been attained. The conductor typically is drawn, rolled, or conformed to obtain a generally rectangular or circular cross-section. The insulation is typically formed as a single or multilayer structure that provides dielectric separation between the conductor and other conductors or surrounding structures that are at different electrical potentials. As such, the insulation is designed to provide a required dielectric strength to prevent electrical breakdowns in the insulation.

However, magnet wire is often susceptible to partial discharge or localized dielectric breakdowns. Partial discharge breakdowns often begin in voids, cracks, inclusions, or weak spots within an enamel layer. For magnet wire incorporating multi-layer insulation, partial discharges can also occur along the boundary between different insulating materials. Partial discharges are typically initiated within gas-filled voids present within a dielectric layer or between layers of a magnet wire (e.g., between the conductor and an enamel layer, between enamel layers, etc.). Because the dielectric constant of a void is considerably lower than the surrounding insulating material, the electric field across the void is significantly higher than that across an equivalent distance of dielectric. If the voltage stress across the void is increased above a corona inception voltage for the gas within the void, partial discharge can initiate, and the partial discharge can lead to a complete breakdown of the insulation over time.

Additionally, when a magnet wire conductor is formed, the conductor's surface often includes imperfections, such as burs, dents, slivers of conductive material, inclusions of foreign material, etc. Similarly, in certain applications (e.g., a motor application), a magnet wire may be placed in a grounded structural device or component (e.g., a laminated stator, etc.) or in proximity to other components having different electrical potential (e.g., a winding of a different phase, etc.). Imperfections along the conductor's surface and/or imperfections along an outer surface of another device or component in proximity to the magnet wire may lead to imperfections within the magnet wire insulation and/or non-uniform local electrical fields within the insulation of the magnet wire. These non-uniform electrical fields may exceed the permissible electrical stress in the insulation and may subsequently lead to the initiation and subsequent development of partial discharge, which may later progress to complete breakdowns in the magnet wire insulation. Accordingly, an opportunity exists for improved winding wire or magnet wire that incorporates semi-conductive layers to reduce stresses on the wire insulation and/or dissipate energy associated with partial discharge.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1A:
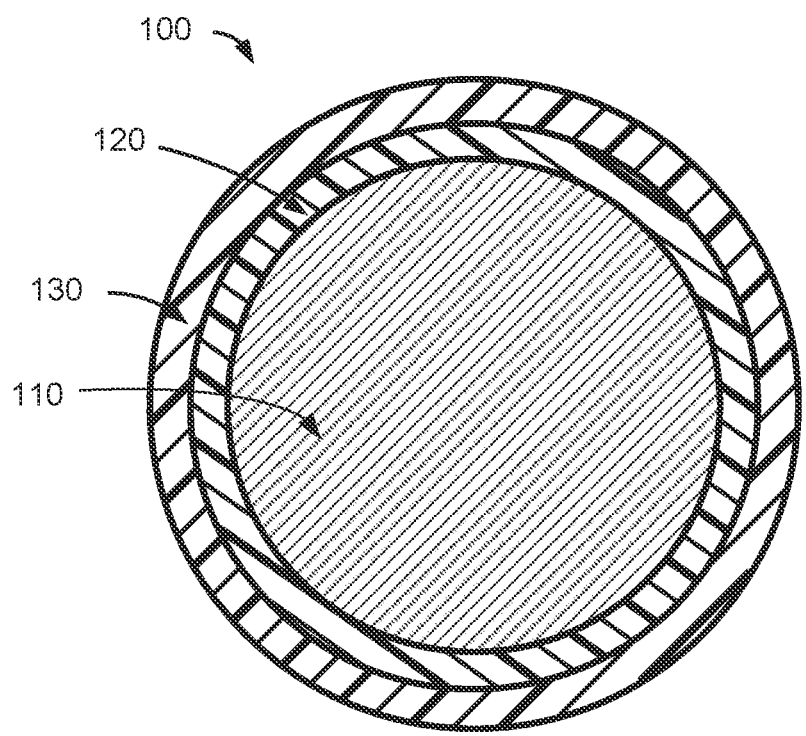
FIGS. 1A-2B illustrate cross-sectional views of example magnet wire constructions that may be formed in accordance with various embodiments of the disclosure.

Certain embodiments of the present disclosure are directed to magnet wire and methods for format magnet wire including a semi-conductive layer that assists in dissipating energy associated with partial discharge. In certain embodiments, magnet wires that include semi-conductive insulation layers are disclosed. A magnet wire may include a conductor and a first layer of polymeric enamel insulation (e.g., a basecoat) formed around the conductor. A wide variety of suitable polymeric materials may be utilized to form the first layer, such as polyimide ("PI") or polyamideimide ("PAI"). Additionally, the magnet wire may include a second layer of polymeric enamel insulation formed around the first layer. According to an aspect of the disclosure, the second layer may include a base polymeric material and filler particles dispersed within the base polymeric material. Additionally, in certain embodiments, at least sixty percent by weight of the filler particles may be positioned in an outer half of a thickness of the second layer. In certain embodiments, the second layer may be an outermost layer or a topcoat layer of the magnet wire.

In other embodiments, a method for forming magnet wires that include semi-conductive insulation layers is described. A conductor may be provided, and a first layer of polymeric enamel insulation (e.g., a basecoat) may be formed around the conductor. A wide variety of suitable polymeric materials, such as PI or PAI, may be utilized to form the first layer. A second layer may then be formed as a semi-conductive layer around the first layer. In order to form the second layer, a base polyamic acid may be provided, and a metal salt or a soluble weaker metal complex may be complexed with the polyamic acid. The polyamic acid may then be applied to the magnet wire around the first layer. The metal salt or the weaker metal complex may be converted such that the metal migrates towards the outer surface of the second layer. For example, a semi-conductive oxide may be formed (e.g., formed by oxidizing a metal chloride, etc.) that results in migration of metal towards the outer surface. As another example, a metal complex may be reduced in the polyamic acid such that metal migrates towards the outer surface. In certain embodiments, at least sixty percent by weight of the metal may be positioned within an outer half of the second layer following the migration. The polyamic acid may then be cured in order to form a semi-conductive enamel layer. In certain embodiments, the second layer may be formed as an outermost layer or a topcoat layer of the magnet wire.

A wide variety of suitable base polymeric materials may be utilized in association with a second layer (e.g., a semi-conductive layer). For example, a base polymeric material may include PI or PAI. As another example, a PI precursor or a PAI precursor may be utilized as a polyamic acid during the formation of a second layer. Additionally, a wide variety of suitable filler particles may be incorporated into a second layer as desired in various embodiments of the disclosure. The filler particles may be incorporated into a second layer via a wide variety of suitable methods, such as oxidizing a metal chloride, reducing a weaker metal complex, or otherwise converting a metal salt or weaker metal complex that has been chemically complexed with a polyamic acid. In certain embodiments, the filler particles may include one of a metal or a metal oxide. For example, in certain embodiments, the filler particles may include at least one of tin (IV) oxide (or tin dioxide), indium (III) oxide, silver, or gold. Further, the filler particles may be incorporated into the second layer at any suitable filled rate or ratio. For example, in certain embodiments, the filler particles may constitute between approximately five percent (5.0%) and approximately twenty percent (20.0%) by weight of the second layer.

In various embodiments, any suitable percentage of filler particles, metal, or metal-containing material by weight may be positioned within an outer half of a second layer. For example, at least sixty percent (60.0%) by weight of the filler particles may be positioned within an outer half of the second layer. In other embodiments, at least seventy-five percent (75.0%) of the filler particles may be positioned within an outer half of the second layer. Additionally, in certain embodiments, at least twenty percent (20.0%) by weight of the filler particles may be positioned at an outer surface of the second layer. Additionally, given the uneven distribution of filler particles within the second layer, the second layer may have different surface resistivities at its inner and outer surfaces. For example, the second layer may include a first surface adjacent to the first layer and a second surface (i.e., an outer surface) opposite the first surface. The first surface resistivity may be higher than the second surface resistivity. For example, the first surface resistivity may be greater than $10^{12}$ Ω/square and the second surface resistivity may be less than $10^9$ Ω/square.

As a result of incorporating a second layer as a semi-conductive layer, the partial discharge performance of a magnet wire may be improved. The semi-conductive layer may dissipate energy associated with a partial discharge event, thereby reducing local stresses in the magnet wire insulation. This enhancement may manifest itself in relatively short-term performance improvements, such as an improvement in the results of voltage breakdown tests and/or partial discharge inception voltage. Additionally, this enhancement may improve the long-term performance of the insulation, as it may mitigate or neutralize the sources for the creation of high gradient local electric fields and subsequently slow down the aging process of the insulation and extend the life expectancy of the magnet wire.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to the drawings, FIG. 1A shows a cross-sectional view of an example round magnet wire 100, which may include a conductor 110 coated with enamel insulation. Any suitable number of enamel layers may be formed around the conductor 110 as desired. As shown, a first enamel layer 120 (or basecoat) may be formed around the conductor 110, and a second enamel layer 130 (or topcoat) may be formed around the first layer 120. In other embodiments, more than two layers of enamel insulation may be utilized. Further, at least one of the enamel layers may be formed as a semi-conductive layer including filler particles dispersed within a base polymeric material. For example, a second enamel layer 130 may be formed as a semi-conductive topcoat layer over a first enamel basecoat layer 120.

Figure 1B:
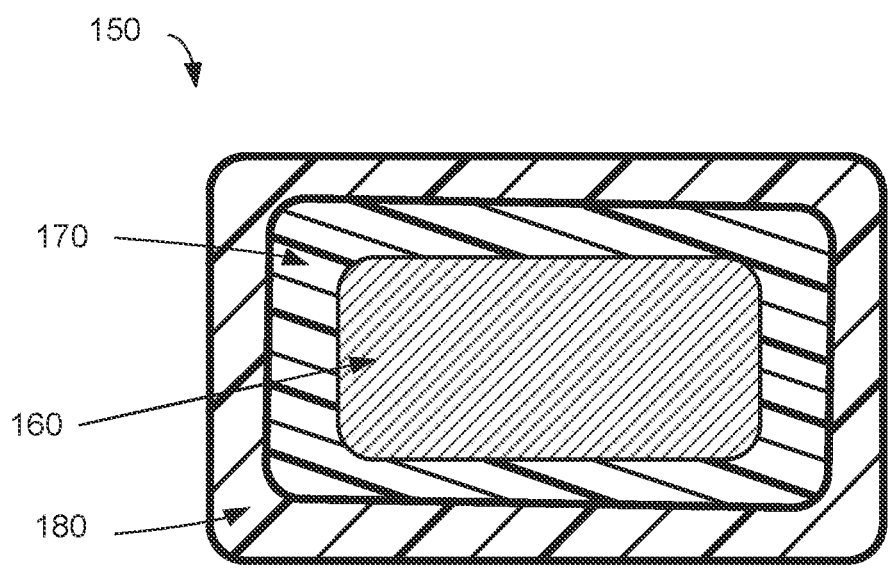

Similarly, FIG. 1B shows a cross-sectional view of an example rectangular magnet wire 150, which may include a conductor 160 coated with enamel insulation. Any suitable number of enamel layers may be formed around the conductor 160 as desired. As shown, a first enamel layer 170 (or basecoat) may be formed around the conductor 160, and a second enamel layer 180 (or topcoat) may be formed around the first layer 170. In other embodiments, more than two layers of enamel insulation may be utilized. Further, at least one of the enamel layers may be formed as a semi-conductive layer including filler particles dispersed within a base polymeric material. For example, a second enamel layer 180 may be formed as a semi-conductive topcoat layer over a first enamel basecoat layer 170. The round wire 100 of FIG. 1A is described in greater detail below; however, it will be appreciated that various components of the rectangular wire 150 of FIG. 1B may be similar to those described for the round wire 100 of FIG. 1A.

The conductor 110 may be formed from a wide variety of suitable materials or combinations of materials. For example, the conductor 110 may be formed from copper, aluminum, annealed copper, oxygen-free copper, silver-plated copper, nickel plated copper, copper clad aluminum ("CCA"), silver, gold, a conductive alloy, a bimetal, or any other suitable electrically conductive material. Additionally, the conductor 110 may be formed with any suitable cross-sectional shape, such as the illustrated circular or round cross-sectional shape. In other embodiments, a conductor 110 may have a rectangular (as shown in FIG. 1B), square, elliptical, oval, or any other suitable cross-sectional shape. As desired for certain cross-sectional shapes such as a rectangular shape, a conductor may have corners that are rounded, sharp, smoothed, curved, angled, truncated, or otherwise formed. The conductor 110 may also be formed with any suitable dimensions, such as any suitable gauge, diameter, height, width, cross-sectional area, etc.

Any number of layers of enamel, such as the illustrated basecoat 120 and topcoat 130, may be formed around the conductor 110. An enamel layer is typically formed by applying a polymeric varnish to the conductor 110 and then baking the conductor 110 in a suitable enameling oven or furnace. The polymeric varnish typically includes thermosetting polymeric material or resin suspended in one or more solvents. A thermosetting or thermoset polymer is a material that may be irreversibly cured from a soft solid or viscous liquid (e.g., a powder, etc.) to an insoluble or cross-linked resin. Thermosetting polymers typically cannot be melted for application via extrusion as the melting process will break down or degrade the polymer. Thus, thermosetting polymers are suspended in solvents to form a varnish that can be applied and cured to form enamel film layers. Following application of a varnish, solvent is removed as a result of baking or other suitable curing, thereby leaving a solid polymeric enamel layer. As desired, a plurality of layers and/or sublayers of enamel may be applied to the conductor 110 in order to achieve a desired enamel thickness or build (e.g., a thickness of the enamel obtained by subtracting the thickness of the conductor and any underlying layers). Each enamel layer may generally be formed utilizing a similar process. For example, a first enamel layer 120 may be formed, for example, by applying a suitable varnish and passing the conductor through an enameling oven. A second enamel layer 130 may subsequently be formed by applying a suitable varnish and passing the conductor through either the same enameling oven or a different enameling oven. Indeed, an enameling oven may be configured to facilitate multiple passes of a wire through the oven. As desired in various embodiments, other curing devices may be utilized in addition to or as an alternative to one or more enameling ovens. For example, one or more suitable infrared light, ultraviolet light, electron beam, and/or other curing systems may be utilized.

As desired, each layer of enamel, such as the basecoat 120 and the topcoat 130, may be formed with any suitable number of sublayers. For example, the basecoat 120 may include a single enamel layer or, alternatively, a plurality of enamel layers or sublayers that are formed until a desired basecoat build or thickness is achieved. Similarly, the topcoat 130 may include one or a plurality of sublayers. Each layer of enamel may have any desired thickness, such as a thickness of approximately 0.0002, 0.0005, 0.007, 0.001, 0.002, 0.003, 0.004, 0.005, 0.006, 0.007, 0.008, 0.009, 0.010, 0.012, 0.015, 0.017, or 0.020 inches, a thickness included in a range between any two of the aforementioned values, and/or a thickness included in a range bounded on either a minimum or maximum end by one of the aforementioned values. Similarly, each layer of enamel may have a thickness of approximately 5, 10, 15, 20, 25, 30, 35, 40, 45, 50, 60, 70, 75, 80, 90, 100, 125, 150, 175, 200, 225, 250, 275, 300, 325, 350, 375, 400, 425, 450, 475, or 500 micrometers, a thickness included in a range between any two of the aforementioned values, and/or a thickness included in a range bounded on either a minimum or maximum end by one of the aforementioned values. Additionally, the combination of enamel layers incorporated into the magnet wire 100 (e.g., the basecoat 120 and the topcoat 130) may have any suitable overall thickness or build.

A wide variety of different types of polymeric materials may be utilized as desired to form an enamel layer, such as the basecoat 120 and/or the topcoat 130. Examples of suitable thermosetting materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. For a semi-conductive layer, such as a semi-conductive topcoat layer, a suitable thermosetting material (e.g., PI, PAI, etc.) may be a base polymeric material in which filler material is dispersed. In certain embodiments, a plurality of enamel layers may include the same polymeric material. For example, both a basecoat 120 and topcoat 130 may include PI or PAI. In other embodiments, at least two enamel layers may be formed with different polymeric materials. For example, the basecoat 120 may be formed from a first polymeric material while the topcoat 130 includes a second polymeric material different than the first polymeric material.

In certain embodiments, the basecoat 120 may include one or more enamel layers, and each layer of the basecoat 120 may be formed from a suitable polymeric material. Additionally, each layer of the basecoat 120 may be formed as either an unfilled layer or, alternatively, as a layer that incorporates any number of suitable additives and/or filler materials. The topcoat 130 may then be formed over the basecoat as a semi-conductive enamel layer that includes filler particles dispersed within a base polymeric material. As desired, any suitable build or thickness ratio between the basecoat 120 and the topcoat 130 may be utilized. In certain embodiments, a thickness or build ratio between the basecoat 120 and the topcoat 130 may be between approximately 95/5 and approximately 85/15. In other words, the thickness or build of the semi-conductive topcoat 130 may constitute between approximately 5.0 percent and approximately 15.0 percent of the overall thickness or build of the combined enamel insulation. In other embodiments, the topcoat 130 may constitute approximately 2, 3, 5, 7, 10, 12, 15, 20, or 25 percent of the overall thickness or build of the combined enamel insulation, a percentage included in a range between any two of the above values, or a percentage included in a range bounded by a minimum or maximum end by one of the above values (e.g., at least 10 percent, no more than 25 percent, etc.)

Figure 2A:
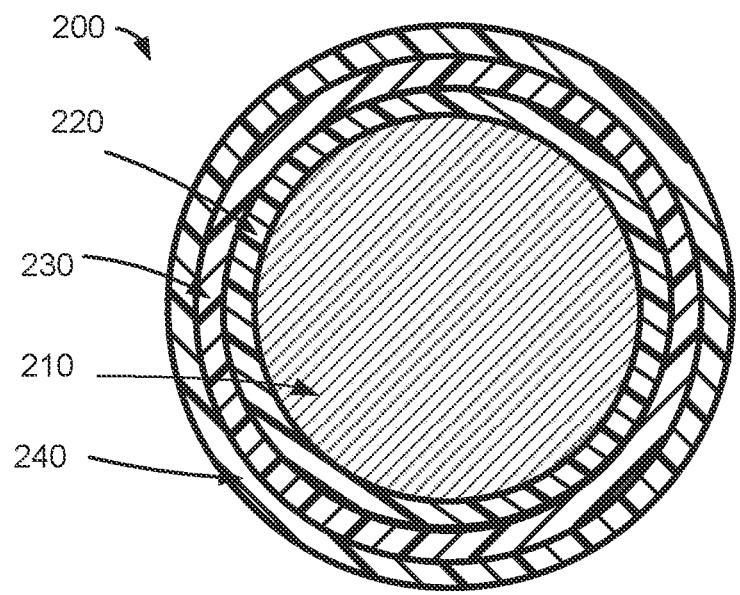
Figure 2B:
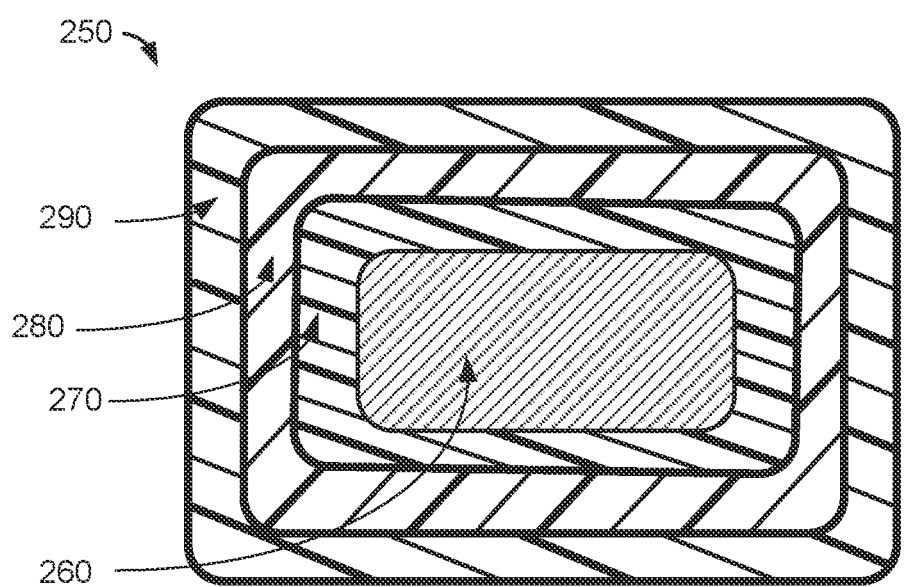

FIG. 2A shows a cross-sectional view of an example three-coat round magnet wire 200. The embodiment shown in FIG. 2A includes a conductor 210 surrounded by a plurality of enamel layers. Any suitable number of enamel layers and/or other insulation layers may be formed around the conductor 210. As shown, a first polymeric enamel layer 220 or basecoat layer is formed around the conductor 210. A second polymeric enamel layer 230 or midcoat is then formed around the basecoat. A third insulation layer 240 or topcoat is then formed around the second polymeric enamel layer 230. Similarly, FIG. 2B shows a cross-sectional view of an example three-coat rectangular magnet wire 250. The wire 250 includes a conductor 260 surrounded by a plurality of enamel layers. As shown, a first polymeric basecoat 270 layer may be formed around the conductor 260, a second polymeric midcoat layer 280 may be formed around the basecoat 270, and a third insulation layer (or topcoat) may be formed around the midcoat. The round wire 200 of FIG. 2A is described in greater detail below; however, it will be appreciated that various components of the rectangular wire 250 of FIG. 2B may be similar to those described for the round wire 200 of FIG. 2A.

With respect to the wire 200 of FIG. 2A, the conductor 210 may be similar to the conductor 110 described above with reference to FIG. 1A. Additionally, in certain embodiments, the three-coat insulation system may be formed from all enamel layers. For example, the basecoat 220 and midcoat 230 may be formed from the same type of enamel or from different types of enamel, and the topcoat 240 may be formed as a semi-conductive enamel layer. In other words, a semi-conductive layer may be formed as a topcoat 240 over a plurality of other enamel layers. As another example, the basecoat 220 may be formed as a first enamel layer, the midcoat 230 may be formed as a semi-conductive layer, and the topcoat 240 may be formed as another enamel layer (e.g., an unfilled enamel layer, etc.). In other embodiments, the three-coat insulation system may be formed with a combination of enamel layers and other types of insulation material. For example, the basecoat 220 may be formed as a first enamel layer, and the midcoat 230 may be formed as a semi-conductive enamel layer around the basecoat 220. A third insulation layer or topcoat 240 may then be formed as a non-enamel layer. For example, a topcoat 240 may be formed as an extruded thermoplastic layer or as a layer of conformal material. Indeed, a wide variety of different types of magnet wire constructions may include any suitable number and/or combinations of insulating layers. According to an aspect of the disclosure, at least one semi-conductive layer may be incorporated into an insulation system. As set forth above, the semi-conductive layer may be a topcoat in certain embodiments and may have at least one additional layer of insulation formed around it in other embodiments.

A wide variety of suitable polymers may be utilized to form various layers of enamel 220, 230, 240, such as any of the example materials discussed above with reference to FIG. 1A. For a semi-conductive layer, such as a semi-conductive topcoat layer, a suitable thermosetting material (e.g., PI, PAI, etc.) may be a base polymeric material in which filler material is dispersed. Additionally, each enamel layer 220, 230, 240 incorporated into the magnet wire 200 may include any desired number of sublayers. Each layer of enamel may also have any desired thickness, such as any of the thicknesses discussed above with reference to FIG. 1A. As desired in various embodiments incorporating a three-layer insulation system, any suitable build or thickness ratio between the semi-conductive layer and other insulation layers may be utilized. For example, any suitable thickness ratio between a topcoat semi-conductive layer and a plurality of underlying enamel layers may be utilized. In certain embodiments, a thickness or build ratio between a semi-conductive layer (e.g., a semi-conductive topcoat 240 and the combined other insulation layers may be between approximately 95/5 and approximately 85/15. In other words, the thickness or build of the semi-conductive layer may constitute between approximately 5.0 percent and approximately 15.0 percent of the overall thickness or build of the combined insulation. In other embodiments, the semi-conductive layer may constitute approximately 2, 3, 5, 7, 10, 12, 15, 20, or 25 percent of the overall thickness or build of the combined insulation, a percentage included in a range between any two of the above values, or a percentage included in a range bounded by a minimum or maximum end by one of the above values (e.g., at least 10 percent, no more than 25 percent, etc.)

With continued reference to the wires 100, 150, 200, 250 of FIGS. 1A-2B, in certain embodiments, one or more suitable additives may be incorporated into one or more enamel layers. An additive may serve a wide variety of suitable purposes, such as promotion of adhesion between various components and/or layers of a wire, enhancing the flexibility of the insulation incorporated into a wire, enhancing moisture resistance, promoting higher temperature stability, functioning as a slip agent (e.g., polyethylene waxes, etc.), or altering a color of an enamel layer (e.g., dyes, etc.). For example, an additive may function as an adhesion promoter to assist or facilitate greater adhesion between a conductor and a basecoat, between various insulation layers, and/or between filler materials and a base polymeric material into which the filler materials are added. A wide variety of suitable additives may be utilized as desired in various embodiments. A few non-limiting examples of potential additives include, but are not limited to, an additive formed from or that includes a material formed by reacting an amine moiety with an aldehyde material (e.g., a glyoxal material, a formaldehyde material, etc.), Cymel material, etc.

In other embodiments, one or more suitable surface modification treatments may be utilized on a conductor and/or any number of enamel layers to promote adhesion with a subsequently formed insulation layer. Examples of suitable surface modification treatments include, but are not limited to, a plasma treatment, an ultraviolet ("UV") treatment, a corona discharge treatment, and/or a gas flame treatment. A surface treatment may alter a topography of a conductor or enamel layer and/or form functional groups on the surface of the conductor or enamel layer that enhance or promote bonding of a subsequently formed enamel or other layer. In certain embodiments, the altered topography may also enhance or improve the wettability of a varnish utilized to form a subsequent enamel layer by altering a surface tension of the treated layer. As a result, surface treatments may reduce interlayer delamination.

As desired in certain embodiments, one or more other layers of insulation may be incorporated into a magnet wire 100, 150, 200, 250 in addition to a plurality of enamel layers. As set forth above with reference to FIG. 2A, a non-enamel layer may be formed over an enamel layer (e.g., a semi-conductive layer) in certain embodiments. Examples of suitable non-enamel layers include, but are not limited to, one or more extruded thermoplastic layers (e.g., an extruded overcoat, etc.), a tape insulation layer (e.g., polymeric tapes, etc.), and/or one or more conformal coatings (e.g., a parylene coating, etc.). A wide variety of other insulation configurations and/or layer combinations may be utilized as desired.

According to an aspect of the disclosure, a magnet wire may include at least one semi-conductive layer. Additionally, the semi-conductive layer may include filler material unevenly dispersed within a base polymeric material. In other words, the majority of the filler material may be concentrated in the top half or outer half of the semi-conductive layer. In certain embodiments, the semi-conductive layer may be formed as a topcoat layer or outermost layer. For example, the topcoat layers 130, 180, 240, 290 of FIGS. 1A-2B may be formed as semi-conductive layers. In other embodiments, a semi-conductive layer may be formed over one or more underlying enamel layers, and at least one additional insulation layer may be formed over the semi-conductive layer. Regardless of whether the semi-conductive layer constitutes a topcoat, the semi-conductive layer may be a second enamel layer formed over a first underlying enamel layer.

A wide variety of suitable materials may be utilized as base polymeric materials in a semi-conductive layer. For example, any of the example thermoset materials discussed above with reference to FIG. 1A may be utilized. In certain embodiments, a base polymeric material may include PI or PAI. As another example, a PI precursor or a PAI precursor may be utilized as a polyamic acid during the formation of a semi-conductive layer. During formation, filler materials may be complexed with a base polyamic acid, and a semi-conductive enamel layer may be formed when the polyamic acid is applied to a magnet wire and cured.

Additionally, a wide variety of suitable filler particles may be incorporated into a semi-conductive layer as desired in various embodiments of the disclosure. In certain embodiments, the filler particles may include metal or a metal oxide. Examples of suitable filler materials include, but are not limited to, metal oxides and/or other metallic materials. Example metal oxides include, but are not limited to, tin dioxide (SnO (IV)), indium (III) oxide, indium/tin oxide, lead (II) oxide, antimony oxide, bismuth (III) oxide, germanium (IV) oxide, gallium (III) oxide, cadmium/indium oxide, zinc/indium oxide, aluminum/zinc oxide, any other metal oxide which exhibits semi-conductive behavior, and/or any suitable combination thereof. Examples of other suitable metallic materials include, but are not limited to silver, gold, etc. The components of a filler material may also include any suitable particle sizes, surface areas, and/or other dimensions. For example, a filler component may have a nominal particle size that is less than approximately one micron. In certain embodiments, a filler component may include nanoparticles.

The filler particles may be incorporated into a semi-conductive layer via a wide variety of suitable methods. In certain embodiments, a metal salt, such as a metal chloride, may be complexed with a polyamic acid, and the metal salt may be converted in the presence of oxygen (i.e., oxidized) in order to form a metallic oxide that migrates towards an outer surface of the semi-conductive layer. For example, tin chloride may be complexed with a polyamic acid (e.g., a PI precursor, etc.). Subsequent thermal cyclization of the polyamic acid in the presence of oxygen may result in the conversion of the tin chloride to a tin oxide that migrates towards the surface of a formed polymeric layer (e.g., a semi-conductive PI layer, etc.). In other embodiments, a weaker metal complex that is soluble in a polyamic acid may be complexed with the polyamic acid. The weaker metal complex may be chemically reduced within the polyamic acid such that metal particles migrate towards the outer surface of a polymeric layer formed from the polyamic acid. A few example techniques for forming a semi-conductive layer are described in greater detail below with reference to FIG. 4.

The filler particles may be incorporated into a semi-conductive layer at any suitable fille rate or ratio. For example, in certain embodiments, the filler particles may constitute between approximately five percent (5.0%) and approximately twenty percent (20.0%) by weight of the semi-conductive layer. As another example, the filler particles may constitute between approximately five percent (5.0%) and approximately ten percent (10.0%) by weight of the semi-conductive layer. In other embodiments, an amount of filler particles may be approximately 5, 7.5, 10, 12.5, 15, 17, 17.5, 20, 25, or 30 percent by weight, an amount included in a range between any two of the above values, or an amount included in a range bounded on either a minimum or maximum end by one of the above values. Additionally, in the event that a combination of filler materials are incorporated into a semi-conductive layer as a filler, any suitable blending ratio may be utilized for the various filler components. In certain embodiments, a blend of filler materials may include approximately equal parts by weight of various filler components (e.g., approximately 50% by weight each for two different filler components, etc.). In other embodiments, an unequal ratio of different filler components may be utilized. For example, a weight ratio of a first filler component to a second filler component may be approximately 80/20, 75/25, 70/30, 67/33, 65/35, 60/40, 55/45, 50/50, 45/55, 40/60, 35/65, 33/67, 30/70, 25/75, 20/80, or any other suitable ratio.

According to an aspect of the disclosure, the filler particles may be unevenly distributed within the base polymeric material of a semi-conductive layer. In particular, due to migration of filler particles towards an outer surface during formation of a semi-conductive layer, a majority of the filler particles may be positioned within an outer half of the semi-conductive layer. In other words, if the semi-conductive layer has a thickness "T" and a cross-sectional line bisects the thickness "T" into two equal halves (i.e., an inner and an outer half), then a majority of the filler particles will be positioned in the outer half within the thickness "T" of the semi-conductive layer. In various embodiments, any suitable percentage of filler particles, metal, or metal-containing material by weight may be positioned within an outer half of a semi-conductive layer. In certain embodiments, at least sixty percent (60.0%) by weight of the filler particles may be positioned within an outer half of the semi-conductive layer. In other embodiments, at least seventy-five percent (75.0%) of the filler particles may be positioned within an outer half of the second layer. In various other embodiments, at least 60, 65, 70, 75, 80, or 85 percent by weight of the filler particles may be positioned within an outer half of the semi-conductive layer. Alternatively, the percentage of filler particles positioned within an outer half of the semi-conductive layer may be included in range between any two of the above values. Additionally, in certain embodiments, a desired percentage by weight of the filler particles may be positioned at an outer surface of the semi-conductive layer. For example, in certain embodiments, at least twenty percent (20.0%) by weight of the filler particles may be positioned at an outer surface of the semi-conductive layer. In other embodiments, at least 15, 20, 25, 30, 35, or 40 percent by weight of the filler particles, or a weight percentage included in a range between any two of the above values, may be positioned at an outer surface of the semi-conductive layer.

Additionally, given the uneven distribution of filler particles within the semi-conductive layer, the semi-conductive layer may have different surface resistivities at its inner and outer surfaces. For example, the semi-conductive layer may include a first surface adjacent to an underlying enamel layer (i.e., a first layer) and a second surface (i.e., an outer surface) opposite the first surface. The first surface resistivity may be higher than the second surface resistivity. In certain embodiments, the first surface resistivity may be greater than $10^{12}$ $\Omega$/square and the second surface resistivity may be less than $10^9$ $\Omega$/square. An ohm/square measurement denotes a surface resistivity over any given square area of a material (e.g., a square meter, etc.). In various embodiments, the first surface resistivity may be greater than approximately $10^{11}$, $10^{12}$, $10^{13}$, or $10^{14}$ $\Omega$/square, or may be included in a range between any two of the above values. Additionally, the second surface resistivity may be less than approximately $10^9$, $10^8$, $10^7$, $10^6$, $10^7$, $10^6$, $10^5$, or $10^4$ $\Omega$/square, or may be included in a range between any two of the above values. Given these different surface resistivities, in certain embodiments, a semi-conductive layer may exhibit characteristics of a semi-conductive material at its outer surface and those of an insulating material at its inner surface.

As a result of incorporating a semi-conductive layer in a magnet wire (e.g., including a semi-conductive layer as a topcoat or as a second layer over a first enamel layer), the partial discharge performance of a magnet wire may be improved. The semi-conductive layer may dissipate energy associated with a partial discharge event, thereby reducing local stresses in the magnet wire insulation. This enhancement may manifest itself in relatively short-term performance improvements, such as an improvement in the results of voltage breakdown tests and/or partial discharge inception voltage ("PDIV"). Additionally, this enhancement may improve the long-term performance of the insulation, as it may mitigate or neutralize the sources for the creation of high gradient local electric fields and subsequently slow down the aging process of the insulation and extend the life expectancy of the magnet wire.

In certain embodiments, the incorporation of a semi-conductive layer may improve the PDIV of a magnet wire by at least 5.0% or by at least 10.0% relative to magnet wire using similar enamel layers that does not include a semi-conductive layer. For example, the PDIV of a magnet wire incorporating PI base insulation with a semi-conductive PI topcoat may be at least 5.0% greater (or, in some cases, at least 10.0% greater) than that of a magnet wire with PI insulation having a similar thickness and no semi-conductive layer. The use of different filler materials may result in different PDIV improvements and, as desired, filler materials and the amounts utilized may be selected to achieve a desired PDIV improvement.

The magnet wires 100, 150, 200, 250 described above with reference to FIGS. 1A-2B are provided by way of example only. A wide variety of alternatives could be made to the illustrated magnet wires 100, 150, 200, 250 as desired in various embodiments. For example, a wide variety of different types of insulation layers may be incorporated into a magnet wire 100, 150, 200, 250 in addition to enamel layers. As another example, the cross-sectional shape of a magnet wire 100, 150, 200, 250 and/or one or more insulation layers may be altered. Indeed, the present disclosure envisions a wide variety of suitable magnet wire constructions. These constructions may include insulation systems with any number of layers and/or sublayers.

Figure 3:
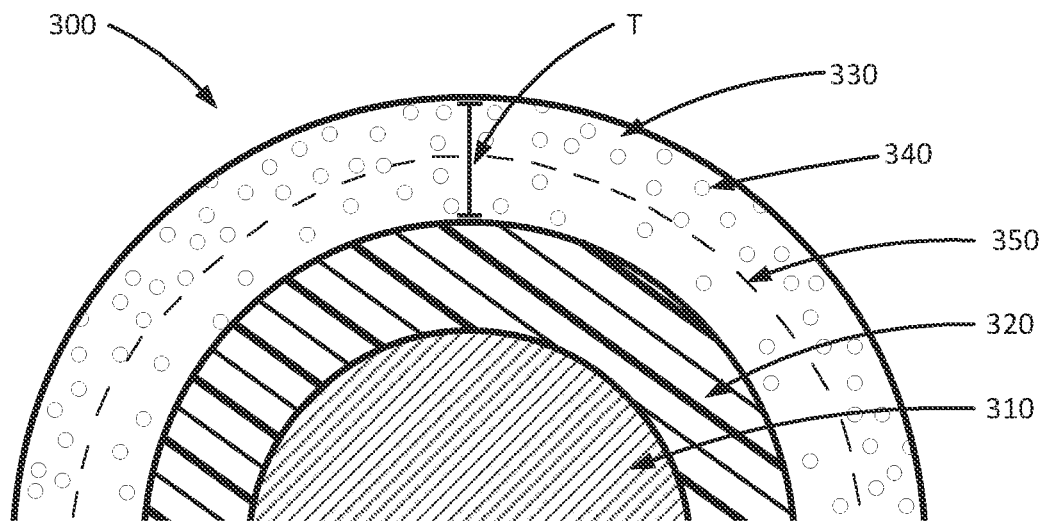
FIG. 3 illustrates a cross-sectional view of an example magnet wire insulation system that includes a semi-conductive enamel layer, according to an illustrative embodiment of the disclosure.

FIG. 3 illustrates a cross-sectional view of an example magnet wire insulation system 300 that includes a semi-conductive enamel layer, according to an illustrative embodiment of the disclosure. The insulation system 300 may be similar to that illustrated in FIG. 1A. In other words, a magnet wire may include a conductor 310 and a first enamel insulation layer 320 or basecoat formed around the conductor 310. Additionally, a second enamel insulation layer 330 (illustrated as a topcoat) may be formed around the first layer 320. According to an aspect of the disclosure, the second layer 330 may be a semi-conductive layer. As set forth in greater detail above, the various layers may be formed from a wide variety of suitable materials and may have a wide variety of suitable thicknesses and/or other dimensions.

With continued reference to FIG. 3, the second layer 330 or semi-conductive layer is illustrated as having an uneven distribution of filler particles within a base polymeric material. For example, the second layer 330 may have a thickness "T". A line 350 (e.g., a curved line matching the shape of the magnet wire) may approximately bisect the second layer 330 such that it is divided into an inner half and an outer half relative to its thickness "T". As shown, a greater percentage of the filler particles may be positioned within the outer half of the second layer 330 (i.e., between the line 350 and an outer surface of the second layer). As set forth above, in certain embodiments, at least 60%, at least 75%, or another suitable percentage of the filler particles may be positioned within the outer half of the second layer 330. Additionally, in certain embodiments, a certain percentage of the filler particles (e.g., at least 20%, at least 25%, etc.) may be positioned at the outer surface of the second layer 330.

Figure 4:
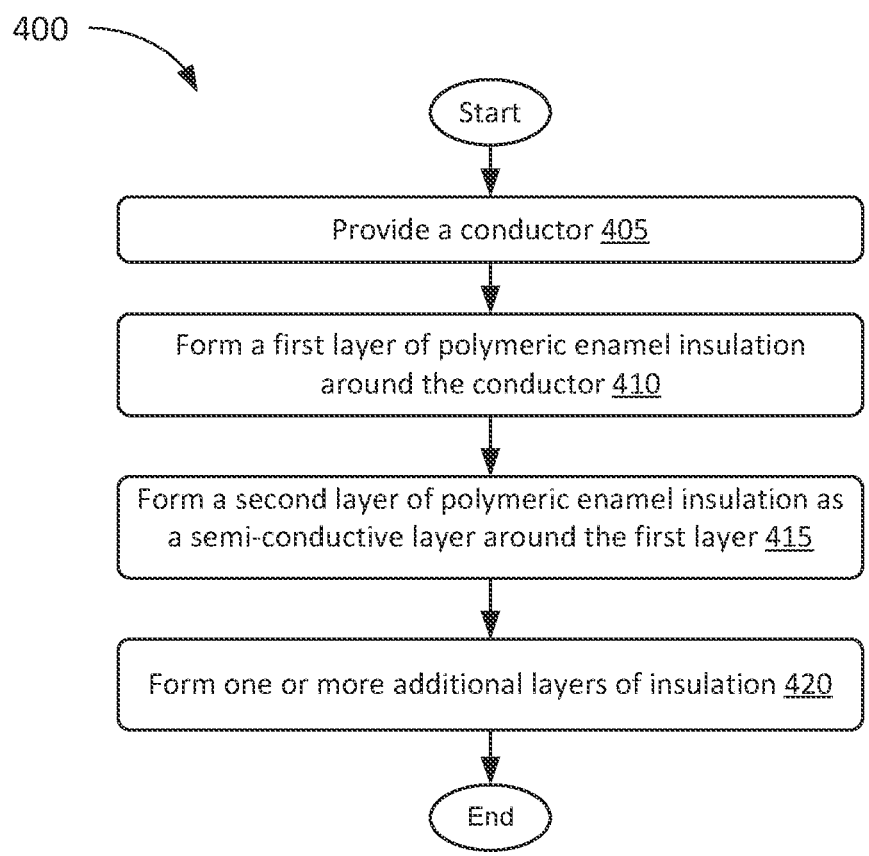
FIG. 4 is a flowchart of an example method for forming magnet wire that includes at least one semi-conductive enamel layer, according to an illustrative embodiment of the disclosure.

FIG. 4 is a flowchart of an example method 400 for forming magnet wire that includes at least one semi-conductive enamel layer, according to an illustrative embodiment of the disclosure. The method 400 may be utilized to form a wide variety of suitable magnet wires, such as any of the wires illustrated in FIGS. 1A-3 and described in greater detail above. The method 400 may begin at block 405, and a suitable magnet wire conductor may be provided. In certain embodiments, a preformed conductor having desired dimensions may be provided. In other embodiments, input material may be provided and processed in order to form a conductor having desired dimensions. For example, input material may be processed by a rod mill, flatteners, and/or rollers in order to provide a conductor having desired dimensions.

At block 410, a first layer of polymeric enamel insulation may be formed on the conductor. A wide variety of suitable materials may be utilized to form a first layer of polymeric enamel insulation, such as any of the materials described above with reference to FIG. 1A. In certain embodiments, the first layer may include PI or PAI. Additionally, as set forth above, the first layer may include any number of sublayers. For example, the first layer may include a plurality of sublayers of PI or PAI. In certain embodiments, the first layer may include a plurality of different enamel layers formed from the same or different materials. For example, the first layer may include a combination of PI, PAI, and/or other enamel layers.

At block 415, a second layer of polymeric enamel insulation may be formed as a semi-conductive layer around the first layer. A wide variety of suitable methods or techniques may be utilized to form the second layer. A few examples techniques are described in greater detail below with reference to FIG. 5. According to an aspect of the disclosure, the second layer may include filler material that is unevenly distributed within a base polymeric material, such a PI or PAI. During formation of the second layer, the filler material may migrate towards an outer surface of the layer such that at least 60%, 75%, or another weight percentage of the filler is positioned within the outer half of the second layer.

At block 420, which may be optional in certain embodiments, one or more additional insulation layers may be formed on the magnet wire. For example, an extruded insulation layer may be formed using a suitable thermoplastic material or blend of thermoplastic materials. As another example, a conformal layer (e.g., a parylene layer) may be formed by vapor deposition. In certain embodiments, the method 400 may end following block 420. In other embodiments, one or more additional operations may be performed. For example, in certain embodiments, the magnet wire may be formed into one or more articles (e.g., coils, hairpins, etc.) that may be incorporated into an electrical appliance. The method 400 may then end following the additional operations.

Figure 5:
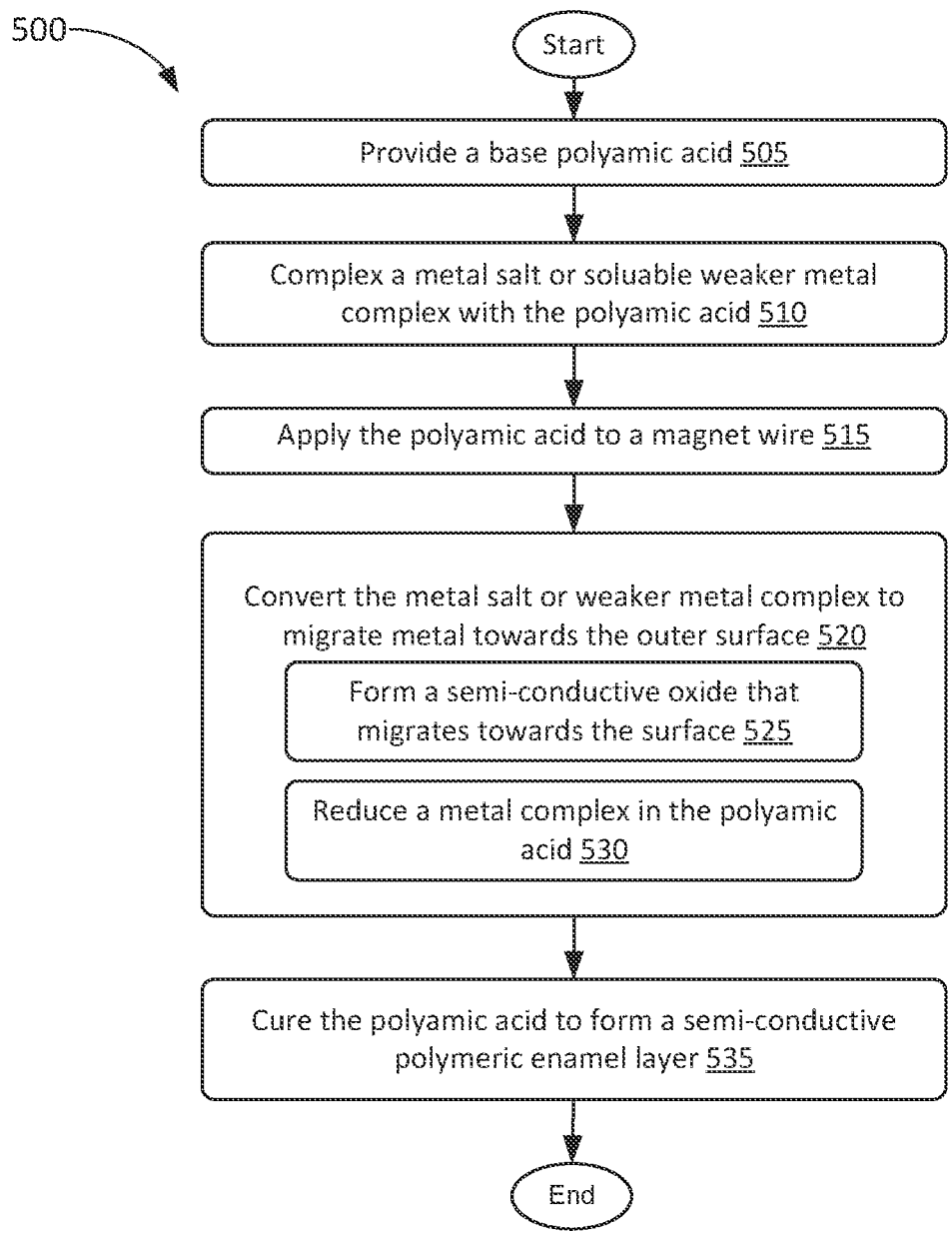
FIG. 5 is a flowchart of an example method for forming a semi-conductive enamel layer on a magnet wire in accordance with an illustrative embodiment of the disclosure.

FIG. 5 is a flowchart of an example method 500 for forming a semi-conductive enamel layer on a magnet wire in accordance with an illustrative embodiment of the disclosure. In certain embodiments, the operations of the method 500 of FIG. 5 may be performed at block 415 in the method 400 of FIG. 4. Additionally, the method 500 may be utilized to form a semi-conductive enamel layer on a wide variety of suitable magnet wires, such as any of the wires illustrated in FIGS. 1A-3 and described in greater detail above. The method 500 may begin at block 505, and a base polyamic acid may be provided. In certain embodiments, a polyamic acid may be a precursor from which a polymeric enamel layer is formed. For example, a PI enamel layer may be formed from a polyamic acid that is a PI precursor. As another example, a PAI enamel layer may be formed from a polyamic acid that is a PAI precursor. As desired, the polyamic acid may be suspended in one or more suitable solvents that permit the polyamic acid to be applied to a magnet wire and subsequently cured.

At block 510, a metal salt or soluble weaker metal complex may be complexed with the polyamic acid. In this regard, filler material may be incorporated into the polyamic acid. In certain embodiments, the metal salt may include a metal chloride that is complexed with the polyamic acid. For example, the metal salt may include tin (IV) chloride, indium (III) chloride, indium/tin chloride, lead (II) chloride, antimony trichloride, bismuth chloride, or any other suitable metallic chloride that can be subsequently oxides to form a metal oxide. In other embodiments, a soluble weaker metal complex may include any suitable metallic filler materials, such as silver and/or gold. For example, silver acetate may be incorporated into the polyamic acid. It will be appreciated that metallic material included in a metal salt or weaker metal complex may be ball-milled or otherwise ground to reduce agglomerates and/or to attain a desired metal particle size.

At block 515, the polyamic acid and the complexed metal-containing material may be applied to a magnet wire. For example, a varnish containing the polyamic acid and metal-containing material in solvent may be applied to a magnet wire. A wide variety of suitable techniques may be utilized to apply a varnish to a magnet wire, such as application dies, brushes, rollers, etc. In certain embodiments, the polyamic acid may be applied to a magnet wire in order to form a second enamel layer as a semi-conductive layer over a first enamel layer.

At block 520, the metal salt or the weaker metal complex may be converted to facilitate migration of metal towards the outer surface of the applied polyamic acid and the polymeric layer formed from the polyamic acid. In certain embodiments, as shown in block 525, a semi-conductive oxide may be formed that migrates towards the outer surface. For example, a metal chloride material may oxidize in order to form a metal oxide that migrates towards the outer surface. Using tin (IV) chloride as a non-limiting representative example, the tin chloride may oxidize and form tin (IV) oxide that migrates towards the outer surface. In other embodiments, as shown in block 530, a weaker metal complex may be reduced in the polyamic acid such that the metal migrates towards the outer surface. As one non-limiting example, silver acetate may be reduced in the polyamic acid such that the silver migrates towards the outer surface. As a result of metal particles migrating towards an outer surface, the metal particles may be unevenly distributed as filler particles in a base polymeric material (i.e., a polymeric material formed from the polyamic acid).

At block 535, the polyamic acid may be cured via any suitable methods or techniques, such as baking in an enameling oven. As a result, solvents may be evaporated and a solid polymeric semi-conductive layer may be formed. For example, curing a PI precursor may result in the formation of a semi-conductive PI layer that includes an uneven distribution of filler particles. As another example, curing a PAI precursor may result in the formation of a semi-conductive PAI layer that includes an uneven distribution of filler particles. The method 500 may end following block 535.

The operations described and shown in the methods 400, 500 of FIGS. 4 and 5 may be carried out or performed in any suitable order as desired in various embodiments. Additionally, in certain embodiments, at least a portion of the operations may be carried out in parallel. Furthermore, in certain embodiments, less than or more than the operations described in FIGS. 4 and 5 may be performed.

EXAMPLES

The following examples are intended as illustrative and non-limiting, and represent specific embodiments of the present invention. Unless otherwise stated, magnet wire samples discussed in the examples were all prepared as 18 AWG round wire with all enamel insulation. In other words, described wire enamels were applied to an 18 AWG copper wire using multi-pass coating and wiping dies. Baseline or control samples included multiple layers or passes of PI enamel without a semi-conductive topcoat. Comparative samples include a PI basecoat with various semi-conductive PI topcoat layers.

A first example illustrated in Table 1 examines the migration of metal filler particles within polyimide films. In order to construct the PI films, tin chloride and indium chloride were respectively added to a polyamic acid at a 7.9% by weight fill ratio. A 12 mil (0.30 mm) thick wet film was then formed on a glass plate using the polyamic acid. The film was baked in an oven at 170° C. for 30 minutes. The oven temperature was then raised to 300° C., and the film was baked for an additional hour. During the formation of the film, the metal chloride materials oxidized such that the filler material migrated towards an outer surface of the film as metal oxides. Table 1 sets forth the amounts of tin and indium material measured at different surfaces of the films using energy dispersive spectroscopy.

TABLE 1

Surface Migration of Metal in PI Film Layers

|  | Film formed using Tin Chloride | Film formed using Indium Chloride |
|---|---|---|
| Metal on Outer Surface | 25.9% | 6.3% |
| Metal on Inner Surface (next to the glass plate) | 5.6% | 4.5% |
| Surface Resistivity of Outer Surface | $1 \times 10^{-5}$ ohms/cm |  |
| Surface Resistivity of Inner Surface | $1 \times 10^{14}$ ohms/cm |  |

As shown in Table 1, for each PI film, a greater amount of metal was positioned at the outer surface than the inner surface. Indeed, significant migration of tin to the outer surface of the film was measured. There was also some measured migration of indium to the outer surface. Further, significant differences in the surface resistivities of the PI film containing tin were measured. At an outer surface of the film, the measured surface resistivity was that of a semi-conductive material. At an inner surface of the film, the measured surface resistivity was that of an insulator. The concentration of metal filler particles at or near the outer surface of the film may improve the partial discharge performance of the film when it is incorporated into a magnet wire.

A second example illustrated in Table 2 compares partial discharge inception voltage ("PDIV") improvements for example magnet wires having various PI semi-conductive topcoats incorporating different filler materials at different fill rates. As an initial matter, baseline PDIV values were determined for magnet wires having various PI enamel film builds without a semi-conductive topcoat. A baseline PDIV value for a given sample was determined when the tested film breaks down under increasing voltage. It is assumed that the breakdown occurs at a spot where the enamel film is the weakest or thinnest. From the baseline samples, a first trend line of PDIV values was plotted. The baseline sample having the best performance relative to the first trend line (i.e., a data value above the trend line) was identified, and a second or adjusted trend line having the same slope as the first trend line was plotted based upon the sample having the best PDIV performance. The second trend line is representative of the maximum PDIV values that can be obtained from conventional PI enamel having given builds or thicknesses.

Additionally, comparative samples were produced that each have a basecoat of PI enamel and different respective semi-conductive topcoats formed with different metallic filler particles at different rates. Each comparative sample includes a PI basecoat formed with a suitable number of sublayers or passes in order to attain a desired film build. Additionally, a semi-conductive topcoat was formed on each sample in a single pass. Each topcoat was formed utilizing a base PI material that was consistent with that utilized to form the corresponding basecoat (e.g., consistent solids content of PI material, etc.). Once the comparative samples were formed, PDIV values were determined at the Essex Furukawa Magnet Wire Testing Laboratory using several industry standard tests. The tests included shot box tests at 25° C. and at 150° C. in accordance with NEMA MW1000 Part 3 Test Method 3.8.7, as set forth by the National Electric Manufacturers Association. In a shot box test, a length of wire is placed in a box filled with lead shot, the wire is energized to form a positive electrode while the shot serves as a negative electrode, and the PDIV may be measured. The tests further included twisted pair tests at 25° C. and at 150° C. in accordance with NEMA MW1000 Part 3 Test Method 3.8.3. In a tested pair test, two insulated wires are formed and twisted together. When energized, one wire is a positive electrode while the other is a negative electrode, and the PDIV may be measured. Table 2 below illustrates measured PDIV values for different comparative samples relative to corresponding values (in parentheses) for baseline samples having the same enamel build. Additionally, PDIV/mil of wire thickness are provided.

TABLE 2

Comparative PDIV Values for Wire Samples with Semi-conductive Topcoats

| | Tin Oxide | Tin Oxide | Tin Oxide | Tin Oxide | Indium Oxide | Silver |
|---|---|---|---|---|---|---|
| Fill Rate of Metal Material | 7.7% | 10.3% | 7.7% | 7.7% | 7.7% | 11.7% |
| Solids % of PI in precursor | 13.2% | 13.2% | 20% | 18% | 18% | 20% |
| Film Build (in inches) | 0.00287 | 0.00289 | 0.00284 | 0.00261 | 0.00291 | 0.00244 |
| PDIV Shot@25 C. | 448 (440) | 442 (440) | 403 (408) | 407 (400) | 431 (415) | 395 (390) |
| PDIV/mil Shot@25 C. | 156 (153) | 153 (153) | 142 (143) | 156 (151) | 148 (151) | 162 (154) |
| PDIV Shot@150 C. | 370 | 407 | 409 (359) | 355 (383) | 434 (415) | 364 (375) |
| PDIV/mil Shot@150 C. | 129 | 141 | 144 (128) | 136 (148) | 149 (146) | 149 (150) |
| PDIV Twist@25 C. | | | | | | 654 |
| PDIV/mil Twist@25 C. | | | | | | 268 |
| PDIV Twist@150 C. | 614 (602) | 610 (610) | 619 (575) | 585 (587) | 579 (601) | 544 (582) |
| PDIV/mil Twist@150 C. | 214 (206) | 211 (205) | 218 (203) | 223 (223) | 199 (207) | 223 (232) |

As shown in Table 2, the formation of a semi-conductive topcoat layer may improve the partial discharge performance of magnet wire. In some of the comparative samples, the PDIV values were improved by 5% or more. It should also be noted that the measured PDIV values were compared to adjusted baseline values that assumed a best possible case for PI baseline samples. The comparative samples were not adjusted to assume a best-case scenario and, therefore, some of the measured PDIV values for the samples fell below the best-case baseline values. This is likely due to imperfect film formation in the comparative samples, such as formation of enamel films having thin spots or weak spots that lead to earlier onset of partial discharge. It was determined from the test data that application of a semi-conductive topcoat improves the PDIV values of a magnet wire relative to conventional wire that includes unfilled insulation.

A third example illustrated in Table 3 evaluates partial discharge inception voltage ("PDIV") improvements for example magnet wires having semi-conductive topcoats films that include tin as a filler material. Four comparative samples were formed that each included a basecoat formed with 11 passes (or sublayers) of unfilled PI. A single semi-conductive topcoat was formed by complexing tin chloride in a polyamic acid, applying the polyamic acid as a topcoat layer, and curing the layer to forma a PI topcoat having an uneven distribution of tin oxide (i.e., tin that has migrated towards an outer surface. The four samples were formed with topcoat layers that were applied at different line speeds and cured at different oven temperatures. For example, two samples each were respectively formed at line speeds of 15 feet per minute and 30 feet per minute. Additionally, one sample formed at each line speed was cured at oven temperatures of 450° F. and 650° F. while a second sample at each line speed was cured at oven temperatures of 550° F.

and 750° F. PDIV values per mil of thickness (e.g., thousands of an inch) for the samples were determined utilizing the shot box and twisted pair tests described above, and the PDIV values were compared to baseline values. Much like the data set forth in Table 2, the baseline PDIV were adjusted baseline values that assumed a best-case PDIV performance.

TABLE 3

Comparative PDIV/mil Values for Wire Samples with Tin Oxide Topcoats

|  | Sample 1 | Sample 2 | Sample 3 | Sample 4 |
|---|---|---|---|---|
| Line Speed | 15 fpm | 30 fpm | 15 fpm | 30 fpm |
| Oven Temp (° F.) | 450/650 | 450/650 | 550/750 | 550/750 |
| Shot@25° C. | 165 | 141 | 245 | 145 |
|  | (156) | (156) | (156) | (156) |
| Shot@150° C. | 162 | 136 | 567 | 172 |
|  | (140) | (140) | (140) | (140) |
| Twist@25° C. | 224 | 212 | 406 | 221 |
|  | (230) | (230) | (230) | (230) |
| Twist@150° C. | 315 | 212 | 504 | 300 |
|  | (220) | (220) | (220) | (220) |

As shown in Table 3, the wire samples formed with a 15 fpm line speed at oven temperatures of 550/750° F. had measured PDIV values that were all significantly higher than baseline values. Indeed, the measured PDIV values were higher than any that had been previously measured by the company. The measured PDIV improvements were statistically above the baseline values, and exceeded typical PDIV improvements associated with other projects. In fact, typical good PDIV improvements are no more than 5-10% over baseline values. However, the improvements measured with some of the wire samples of FIG. 3 were much greater.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a magnet wire, the method comprising:
    providing a conductor;
    forming a first layer of polymeric enamel insulation around the conductor;
    forming a second layer of polymeric enamel insulation around the first layer, wherein forming the second layer comprises:
        providing a base polyamic acid and complexing filler particles with the base polyamic acid;
        applying the polyamic acid around the first layer;
        migrating the filler particles towards the outer surface of the second layer; and
        curing the polyamic acid to form a semi-conductive enamel layer, wherein at least sixty percent by weight of the filler particles are positioned within an outer half of the second layer following the migration.

2. The method of claim 1, wherein complexing filler particles with the base polyamic acid comprises complexing a metal salt.

3. The method of claim 2, wherein the metal salt comprises one of tin (IV) chloride, indium (III) chloride, indium/tin chloride, lead (II) chloride, antimony trichloride, or bismuth chloride.

4. The method of claim 2, wherein migrating the filler particles comprises forming a semi-conductive oxide.

5. The method of claim 1, wherein complexing filler particles with the base polyamic acid comprises complexing a soluble weaker metal complex.

6. The method of claim 5, wherein the soluble weaker metal complex comprises one of silver or gold.

7. The method of claim 5, wherein migrating the filler particles comprises reducing the weaker metal complex in the polyamic acid.

8. The method of claim 1, wherein the base polyamic acid comprises one of a polyimide precursor or a polyamideimide precursor.

9. The method of claim 1, wherein at least seventy-five percent by weight of the filler particles are positioned within an outer half of the second layer following the migration.

10. The method of claim 1, wherein at least twenty percent by weight of the filler particles are positioned at an outer surface of the second layer following the migration.

11. The method of claim 1, wherein the filler particles comprise between five percent and twenty percent by weight of the second layer.

12. The method of claim 1, wherein the second layer comprises an outermost layer of the magnet wire.

13. A method of forming a magnet wire, the method comprising:
    providing a conductor;
    forming a first layer of polymeric enamel insulation around the conductor;
    forming a second semi-conductive enamel layer around the first layer, wherein forming the second layer comprises:
        complexing filler particles with a base polyamic acid;
        applying the polyamic acid around the first layer; and
        curing the polyamic acid, wherein at least a portion of the filler particles migrate towards the outer surface of the second layer prior to curing, wherein at least sixty percent by weight of the filler particles are positioned within an outer half of the second layer following the migration.

14. The method of claim 13, wherein complexing filler particles with a base polyamic acid comprises complexing a metal salt with a base polaymic acid.

15. The method of claim 14, wherein the metal salt comprises one of tin (IV) chloride, indium (III) chloride, indium/tin chloride, lead (II) chloride, antimony trichloride, or bismuth chloride.

16. The method of claim 13, wherein complexing filler particles with 1 base polyamic acid comprises complexing a soluble weaker metal complex with a base polyamic acid.

17. The method of claim 16, wherein the soluble weaker metal complex comprises one of silver or gold.

18. The method of claim 13, wherein the base polyamic acid comprises one of a polyimide precursor or a polyamideimide precursor.

19. The method of claim 13, wherein at least seventy-five percent by weight of the filler particles are positioned within an outer half of the second layer following the migration.

20. The method of claim 13, wherein at least twenty percent by weight of the filler particles are positioned at an outer surface of the second layer following the migration.

21. The method of claim 13, wherein the filler particles comprise between five percent and twenty percent by weight of the second layer.

* * * * *